(12) United States Patent
Molaro

(10) Patent No.: US 7,801,820 B2
(45) Date of Patent: Sep. 21, 2010

(54) REAL-TIME DELIVERY OF LICENSE FOR PREVIOUSLY STORED ENCRYPTED CONTENT

(75) Inventor: Donald Joseph Molaro, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1815 days.

(21) Appl. No.: 10/342,078

(22) Filed: Jan. 13, 2003

(65) Prior Publication Data

US 2004/0139027 A1 Jul. 15, 2004

(51) Int. Cl.
*G06F 21/00* (2006.01)
*G06Q 20/00* (2006.01)

(52) U.S. Cl. .............................. 705/59; 705/50; 705/65; 705/75

(58) Field of Classification Search ................... 705/50, 705/51, 59, 65, 75
See application file for complete search history.

(56) References Cited

U.S. PATENT DOCUMENTS

| | | | |
|---|---|---|---|
| 4,583,346 A | 4/1986 | Kameda | 53/431 |
| 4,789,860 A | 12/1988 | Brennand et al. | 340/825.51 |
| 4,797,919 A | 1/1989 | Murray et al. | 380/20 |
| 4,802,215 A | 1/1989 | Mason | 380/21 |
| 4,817,143 A | 3/1989 | Murray | 380/20 |
| 5,386,226 A | 1/1995 | Chanteau | 348/10 |
| 5,563,714 A | 10/1996 | Inoue et al. | 386/66 |
| 5,737,421 A | 4/1998 | Audebert | 380/23 |
| 5,848,934 A | 12/1998 | Shiels et al. | 463/9 |
| 5,887,065 A | 3/1999 | Audebert | 380/23 |
| 5,892,900 A * | 4/1999 | Ginter et al. | 726/26 |
| 5,915,018 A | 6/1999 | Aucsmith | 380/4 |
| 5,920,572 A | 7/1999 | Washington et al. | 370/535 |
| 5,936,660 A | 8/1999 | Gurantz | 348/10 |
| 5,991,399 A | 11/1999 | Graunke et al. | 380/4 |
| 6,016,348 A | 1/2000 | Blatter et al. | 380/5 |
| 6,035,397 A | 3/2000 | Campinos et al. | 713/39 |
| 6,040,851 A | 3/2000 | Cheng et al. | 348/10 |
| 6,119,108 A | 9/2000 | Holmes et al. | 705/40 |
| 6,198,875 B1 | 3/2001 | Edenson et al. | 386/94 |

(Continued)

FOREIGN PATENT DOCUMENTS

WO 00/56068 A1 9/2000

OTHER PUBLICATIONS www.apple.com/quicktime/streamingserver/.*

(Continued)

*Primary Examiner*—Charles C Agwumezie
(74) *Attorney, Agent, or Firm*—Haverstock & Owens LLP

(57) ABSTRACT

Content is stored as ClearText by a content provider within a trusted area. Specific content is requested by an end user, preferably via a service provider, and the requested content is encrypted and then delivered over a secure communications channel to a home server system. While the encrypted content is stored on the home server system, the associated encryption keys are stored as a license with the content provider. When a playback device on the home server system is instructed to play back the encrypted content, the encrypted content is streamed from local storage within the home server system while the associated encrypted keys are simultaneously streamed from the content provider to the playback device.

33 Claims, 5 Drawing Sheets

U.S. PATENT DOCUMENTS

| | | | |
|---|---|---|---|
| 6,219,422 B1 | 4/2001 | Sato | 380/240 |
| 6,242,717 B1 | 6/2001 | Sanderson | 219/405 |
| 6,256,393 B1 | 7/2001 | Safadi et al. | 380/232 |
| 6,263,313 B1 * | 7/2001 | Milsted et al. | 705/50 |
| 6,266,415 B1 | 7/2001 | Campinos et al. | 380/247 |
| 6,307,937 B1 | 10/2001 | Dillon et al. | 380/43 |
| 6,327,652 B1 | 12/2001 | England et al. | 713/2 |
| 6,330,670 B1 | 12/2001 | England et al. | 713/2 |
| 6,331,979 B1 | 12/2001 | Dillon et al. | 370/392 |
| 6,385,317 B1 | 5/2002 | Rix et al. | 380/258 |
| 6,385,596 B1 | 5/2002 | Wiser et al. | 705/51 |
| 6,424,714 B1 | 7/2002 | Wasilewski et al. | 380/200 |
| 6,430,290 B1 | 8/2002 | Van Willigen et al. | 380/1 |
| 6,459,794 B1 | 10/2002 | de Vito et al. | 380/210 |
| 6,463,155 B1 | 10/2002 | Akiyama et al. | 380/278 |
| 2001/0011238 A1 | 8/2001 | Eberhard et al. | 705/27 |
| 2001/0018858 A1 | 9/2001 | Dwek | 84/609 |
| 2001/0019613 A1 | 9/2001 | Dillon et al. | 380/240 |
| 2001/0037256 A1 | 11/2001 | Yazawa | 705/26 |
| 2001/0052077 A1 | 12/2001 | Fung et al. | 713/184 |
| 2001/0053226 A1 | 12/2001 | Akins, III et al. | 380/282 |
| 2002/0002674 A1 | 1/2002 | Grimes et al. | 713/156 |
| 2002/0012432 A1 | 1/2002 | England et al. | 380/231 |
| 2002/0019814 A1 | 2/2002 | Ganesan | |
| 2002/0021805 A1 | 2/2002 | Schumann et al. | 380/201 |
| 2002/0035557 A1 | 3/2002 | Nagahara | 707/1 |
| 2002/0038246 A1 | 3/2002 | Nagaishi | 705/14 |
| 2002/0040320 A1 | 4/2002 | Tanaka | 705/14 |
| 2002/0044657 A1 | 4/2002 | Asano et al. | 380/201 |
| 2002/0046405 A1 | 4/2002 | Lahr | 725/87 |
| 2002/0069420 A1 | 6/2002 | Russell et al. | 725/92 |
| 2002/0073177 A1 | 6/2002 | Clark et al. | 709/219 |
| 2002/0085722 A1 | 7/2002 | Asano et al. | 380/278 |
| 2002/0091584 A1 | 7/2002 | Clark et al. | 705/26 |
| 2002/0094084 A1 | 7/2002 | Wasilewski et al. | 380/241 |
| 2002/0099663 A1 | 7/2002 | Yoshino et al. | 705/65 |
| 2002/0106086 A1 | 8/2002 | Kamiya et al. | |
| 2002/0124098 A1 | 9/2002 | Shaw | 709/231 |
| 2002/0133490 A1 | 9/2002 | Conkwright et al. | 707/9 |
| 2002/0143807 A1 | 10/2002 | Komatsu | 707/500 |
| 2002/0146237 A1 | 10/2002 | Safadi | 386/94 |
| 2002/0147906 A1 | 10/2002 | Lotspiech et al. | 713/158 |
| 2002/0150251 A1 | 10/2002 | Asano et al. | 380/277 |
| 2002/0152215 A1 | 10/2002 | Clark et al. | 707/10 |
| 2002/0157002 A1 | 10/2002 | Messerges et al. | 713/155 |
| 2003/0005285 A1 | 1/2003 | Graunke | |
| 2003/0005435 A1 | 1/2003 | Nelger et al. | |
| 2007/0101123 A1 * | 5/2007 | Kollmyer et al. | 713/154 |
| 2007/0204146 A1 * | 8/2007 | Pedlow et al. | 713/153 |
| 2007/0206682 A1 * | 9/2007 | Hamilton et al. | 375/240.25 |

OTHER PUBLICATIONS

Rosenblatt B et al, "Digital Rights Management, Passage", Digital Rights Management, Business and Technology, New York, NY, M&T Books, US, Jan. 1, 2002, pp. 79-88, 95, XP002341140, ISBN: 978-0-7645-4889-5, Figures 5-1, 5-2, pp. 80-84.
IBM-EMMS, "AlbumDirect TM Trial Technical Fact Sheet", 2001.
Claire P. Briggs, "IBM Expands its Digital Rights Management Technology", Apr. 8, 2002.
IBM Corporation, "EMMS Software Suite", 2001.
Microsoft Corporation, "Architecture of DRM", 2001.
Microsoft Corporation, "Features of DRM", 2001.
Microsoft Corporation, "New Security Features", 2001.
Microsoft Corporation, "Business Scenarios", 2001.
Microsoft Corporation, "Microsoft DRM Offerings", 2001, pp. 1-4.
Microsoft Corporation, "Windows Media Embedded Product Adaptation Kit (WMEPAK)", 2001.
Microsoft Corporation, "Application Development", 2001.
Microsoft Corporation, "Windows Media 7 Embedded Product Adaptation Kit", 2001.
Microsoft Corporation, "Windows Media Format SDK 7.1.1.", 2001.
Microsoft Corporation, "Windows Media Format 7.1 SDK", 2000-2001.
Microsoft Corporation, "Window Media Format in Client and Server Applications", 2000-2001.
Microsoft Corporation, "Introducing Windows Media Device Manager", 2000-2001.
Microsoft Corporation, "Getting Started with Windows Media Rights Manager 7 SDK", 2002, pp. 1-7.
Microsoft Corporation, "Enabling Digital Rights Management in Your Windows Media Application", 2002, p. 1.
Microsoft Corporation, "Creating a Subscription Service with Windows Media Rights Manager 7", 2001.
Cisco Systems, Inc., "OCCAM: Open Conditional Content Access Management", Oct. 19, 2001, 34 pages.
"Software Toolkit", Sep. 17, 1002, p. 1.
"RealNetworks and RPK SecureMedia Announce the Industry's First Secure Streaming Media System", 2000 Press Releases.
Secure Media, "Encryptonite System Overview Data Sheet", Mar. 22, 2002.
"SecureMedia", Jun. 30, 2002.
SecureMedia, Inc., "Executive Summary", Jun. 2002, pp. 1-2.
"RPK SecureMedia Receives Multi-Million Dollar Financing from CB (Berkman) Capital LLC, Macrovision, Sony, Trans Cosmos", pp. 1-2.
SecureMedia Inc., "Encryptonite TM System E-Commerce Integration Overview White Paper", May 8, 2002, pp. 1-14.
SecureMedia Inc., "Encryptonite TM System Overview", Dec. 13, 2001, pp. 1-20.
SecureMedia Inc., "Encryptonite TM System Overview Services v1.2", pp. 1-19.
SecureMedia Inc., "Indexed Encryption White Paper", pp. 1-16.
Macrovision, "Secure Media Distribution (MacroSAFE)", Sep. 17, 2002.
Widevine Technologies, "The First Complete Security Solution for Streaming Media", Feb. 15, 2001.
Widevine Technologies, "Streaming Media", 2002.
Anthony Wechselberger, "Designing for Security and Open Architectures", Tech, Oct. 2001.
"Entriq and Ivast Develop MPEG-4 Security Solution For Streaming Media", Press Releases, Jul. 25, 2001.
Thomson MultiMedia, "SmartRight [tm]", Jul. 11, 2001.
Thomson MultiMedia, "SmartRight Copy and Protection System for Digital Home Networks", CPTWG, Jul. 11, 2001.
Entriq, Inc., "Product Release Note Digital Rights Network v2.0", Dec. 5, 2001.
James Nechvatal et al., "Report on the Development of the Advanced Encryption Standard (AES)", NIST, 114 pages.
Mark S. Manasse, "Why Rights Management is Wrong (and What to Do Instead)", Compaq Systems Research Center.
Spencer Cheng et al., "Trusting DRM Software", Jan. 2001.
Renato Iannella, "Digital Rights Management (DRM) Architectures", D-Lib Magazine, vol. 7, No. 6, Jun. 2001.
Thomas Pack, "Digital Rights Management: Can Technology Provide Long-Term Solutions?", EContent, May 2001, pp. 22-27.
Damien Cave, "Chained Melodies", Salon.com Technology, Mar. 13, 2002, pp. 1-8.
Mike Godwin, "Coming Soon: Hollywood Versus the Internet", Dec. 18, 2001.
"A "Speed Bump" vs. Music Copying", Newsmaker Q & A, Jan. 9, 2002, pp. 1-4.
RealNetworks, Inc., "Creating Optimal Broadband RealVideo TM 8 Content", 2000, pp. 1-22.
Jeffrey A. Bloom et al., "Copy Protection for DVD Video", IEEE, vol. 87, No. 7, Jul. 1999, pp. 1267-1276.
Frank A. Stevenson, "Cryptanalysis of Contents Scrambling System", Nov. 8, 1999.
"SMPTE Digital Cinema Study Group DC28.4 on Encryption and Conditional Access", Interim Report, Release Version 10, Sep. 10, 2001, pp. 1-70.

Digital Transmission Licensing Administrator, "DTLA, Sony Pictures Entertainment and Warner Bros. Announce First Studio Licenses for Digital Home Network Technology", Jul. 17, 2001, pp. 1-2.

Hitachi, Ltd. et al., "5C Digital Transmission Content Protection White Paper", Revision 1.0, Jul. 14, 1998, pp. 1-13.

Intel Corporation et al, "Content Protection System Architecture, A Comprehensive Framework for Content Protection", Revision 0.81, Feb. 17, 2000, pp. 1-19.

Scott Crosby et al., "A Cryptanalysis of the High-Bandwidth Digital Content Protection System", Cryptoananlysis of the HDCP Key Exchange Protocol, Nov. 9, 2001, pp. 1-10.

Secure Digital Music Initiative, "Guide to the SDMI Portable Device Specification", Part 1, Version 1.0, pp. 1-5.

Secure Digital Music Initiative, "SDMI Portable Device Specification", Part 1, Version 1.0, Jul. 8, 1999, pp. 1-35.

Secure Digital Music Initiative, "Amendment 1 to SDMI Portable Device Specification", Part 1, Version 1.0, Sep. 23, 1999, pp. 1-2.

NDS, "XTV, Content Protection and Pay TV Models".

InterTrust, "Enabling Digital TV Operators to Deploy Advanced Interactive and On-Demand Consumer Services", Rights System, 2001.

InterTrust,, "Efficient Content Packaging for Multiple Media Types and Formats", Rights System, 2001.

InterTrust,, "Industrial-Strength Infrasturcture for Digital Rignt Management", Rights System, 2001.

InterTrust,, "A Trusted Environment for Governing Content Usage on Consumer Devices", Rights System ,2001.

InterTrust,, "Rapid Development and Integration of DRM-Enabled Products", Rights System, 2001.

InterTrust,, "Digital Rights Management (DRM) for Secure Document Management and Digital Publishing", Rights PDF, 2001.

InterTrust, "Rapid Assessment", InterTrust Professional Services, 2001.

InterTrust, "Maximizing Revenues in the Digital Age", Rights System, 2001.

InterTrust, "InterTrust Technologies Corporation Corporate Backgrounder", Nov. 12, 2001, pp. 1-2.

InterTrust, "Quotes from Media and Analysts Regarding InterTrust's New Rights/System Platform", 2001.

InterTrust, "Pace and InterTrust Join Forces to Offer Broadband Operators DRM-Enabled IPTV Home Gateways", 2001, pp. 1-3.

InterTrust, "Envivio Joins InterTrusts Rights/Alliance Program", 2001, pp. 1-3.

InterTrust, "Microsoft's .Net Platform and XP Operating System Charged with Infringing InterTrust Patents", 2001, pp. 1-2.

InterTrust, "InterTrust Selects Sun Microsystems As Primary Platform Provider for New Rights/Alliance Program", 2001, pp. 1-2.

InterTrust "InterTrust, Artesia, nCUBE, Portal Software and SkyStream Join Forces to Offer Service Providers Content Monetization Solutions", 2001, pp. 1-4.

InterTrust, "Other Recent InterTrust Press Releases", 2001.

Joshua Duhl et al., "Understanding DRM Systems", IDC White Paper, 2001, pp. 1-28.

RealNetworks Inc., "RealSystem Media Commerce Suite, Enabling Your Digital Media Business", 2001.

B. Rosenblatt et al., "Digital Rights Management Business and Technology", M & T Books, 2002, pp. 79-102.

SecureMedia, "Introduction to the Encryptonite System", Technical White Paper, 2002.

R. Koenen, "Intellectual Property Management and Protection in MPEG Standards", ISO/IEC.

* cited by examiner

REAL-TIME DELIVERY OF LICENSE FOR PREVIOUSLY STORED ENCRYPTED CONTENT

FIELD OF THE INVENTION

The present invention relates to the field of content delivery. More particularly, the present invention relates to the field of real-time delivery of a license for previously stored encrypted content.

BACKGROUND OF THE INVENTION

High quality digital video entertainment will not be Internet delivered without effective content protection. Content providers view content protection as an absolute must have before compelling content is released for network connected devices. Moreover, it seems unreasonable to assume that in the future consumers will accept inferior quality content, or an inferior experience based upon the limitations of the Internet. The technology exists for content providers to provide high quality content over the Internet. However, digital content by its very nature is easy to duplicate either with or without the copyright holders permission. Broadband Internet allows the delivery of the content from the legal copyright holder, but that same technology also allows for the wide spread distribution of improperly duplicated content.

There are two predominate and rather distinct digital content protection models: Conditional Access (CA), and Digital Rights Management (DRM). The CA technology is based on encryption of live content that is broadcasted to consumers and the presence of a set-top box that has the ability to selectively decrypt the content. The digital content is encrypted during transmission at the uplink site and distributed over an broadcast network. Providing the keys to decrypt the content only to authorized subscribers restricts the content access. The keys are typically protected using smart card technology.

The DRM technology addresses the need for protecting file distribution. DRM has emerged as a complex set of technologies and business models to protect digital media copyrights and to provide revenue to content owners.

Most DRM systems use the same overall systems design as illustrated in FIG. 1. A ClearText Repository 10 includes a collection of content provided by content owners. The ClearText Repository 10 resides within a trusted area behind at least one firewall 15. Within the trusted area, content residing on the ClearText Repository 10 can be encrypted. An Encrypted Content Server 20 receives encrypted content from the ClearText Repository 10 and packages the encrypted content for distribution. A License Server 30 holds description of rights and usage rules associated with the encrypted content, as well as associated encryption keys. A playback device 40 receives encrypted content from the Encrypted Content Server 20 for display and communicates with the License Server 30 to verify access rights.

The DRM process consists of requesting a unit of content, encrypting the unit of content with a session key, storing the session key in a content license, distributing the encrypted content to a playback device, delivering a license file that includes the encrypted session key to the playback device, and decrypting the content file and playing it under the usage rules specified in the license. A significant security issue exists in this process in that a content provider loses a degree of control over the content's security and distribution once the encrypted content and associated license file are transmitted to and stored on the playback device. Although the playback device may include a trusted area where the encrypted content is decrypted and decoded, the trusted area on a playback device is less secure than a trusted area maintained directly by the content provider.

A better set of protection mechanisms than CA and DRM is necessary to accomplish delivery of any media to any device on the Internet.

SUMMARY OF THE INVENTION

Content is preferably stored as ClearText by a content provider within a trusted area. Specific content is requested by an end user, preferably via a service provider, and the requested content is encrypted and then delivered over a secure communications channel to a home server system. While the encrypted content is stored on the home server system, the associated encryption keys are stored as a license with the content provider. When a playback device on the home server system is instructed to play back the encrypted content, the encrypted content is streamed from local storage within the home server system while the associated encrypted keys are simultaneously streamed from the content provider to the playback device.

In one aspect of the present invention, a method securely provides content from a content source to a local device. The method comprises downloading and storing encrypted content from the content source to a local storage, storing one or more encryption keys corresponding to the encrypted content at the content source, and utilizing the encrypted content by streaming the encrypted content from the local storage to a processing circuit within the local device while the one or more encryption keys are simultaneously streamed from the content source to the processing circuit. The one or more encryption keys can be streamed from the content source to the processing circuit over a secure connection. Utilizing the encrypted content can include playing the content on an audio or display device. The processing circuit decrypts the encrypted content using the one or more encryption keys. The encrypted content need not be downloaded from the content source to the local storage in real-time. The content comprises audio, video, or image data. The one or more encryption keys can be stored at the content source as encrypted encryption keys. The method can also include utilizing a secure clock to synchronize streaming of the encrypted content and the one or more encryption keys. The secure clock can ensure the enforcement of time-based rules associated with the one or more encryption keys. The secure clock can be located at the content source.

In another aspect of the present invention, a network of devices securely processes content. The network of devices comprises a remote content source, a local storage coupled to the remote content source to store encrypted content received from the remote content source, and a local device coupled to the local storage to receive the encrypted content streamed from the local storage while one or more encryption keys are simultaneous streamed from the content source to the local device, wherein the local device decrypts the encrypted content according to the one or more encryption keys. The local storage can reside within a home server. The local device can comprise the home server. The local device can comprise a set-top box coupled to the home server. The local device can comprise a television coupled to the home server. The network of devices can also include an audio or display device coupled to the local device, wherein the local device sends the decrypted content to the audio or display device for playback. The content source can include a secure clock and the local device can utilize the secure clock to synchronize the decryption of the encrypted content according to the one or more encryption keys. The local device and the local storage can be coupled via a home network. The home network and the content server can be coupled to the internet. The home network can be coupled to the internet via a broadband connection. The home network can comprise an ethernet network. The home network can comprise a wireless network. The one or more encryption keys can be stored at the content source as encrypted encryption keys. The content comprises audio, video, or image data.

In yet another aspect of the present invention, a device securely process content. The device comprises an input/output interface to receive a stream of encrypted content from a local storage and to receive a stream of one or more encryption keys from a content source, and a processing circuit coupled to the input/output interface to receive the stream of encrypted content and the stream of one or more encryption keys, and to decrypt the encrypted content according to the one or more encryption keys. The device can comprise a home server. The device can comprise a set-top box. The device can comprise a television. The local storage can reside within the device. The device can be coupled to an audio or display device, and the processing circuit sends the decrypted content to the audio or display device via the interface for playback. A secure clock can be utilized to synchronize the decryption of the encrypted content according to the one or more encryption keys. The secure clock can be located on the content source. The device can reside within a home network. The device can be coupled to the content source via the internet. The content comprises audio, video, or image data.

DETAILED DESCRIPTION OF THE EMBODIMENTS

Embodiments of the present invention provide for a system architecture that allows for seamless integration of content protection into an existing content delivery and playback system. The content protection system is designed to provide an end-to-end security solution for digital content preferably delivered over the Internet to a home server system and played back on a Client Network Module (CNM) device. The systems architecture is preferably independent of specific implementation technologies.

Content is preferably stored as ClearText by a content provider within a trusted area. Specific content is requested by an end user, preferably via a service provider, and the requested content is encrypted and then delivered over a secure communications channel to the home server system. While the encrypted content is stored on the home server system, the associated encryption keys are stored as a license with the content provider. When the CNM device on the home network system is instructed to play back the encrypted content, the encrypted content is streamed from local storage within the home server system while the associated encrypted keys are simultaneously streamed from the content provider to the CNM device. The main advantage of this type of content distribution system is that there is very limited real time demands placed on the Internet. Moreover, it is possible to deliver high bandwidth content over relatively lower bandwidth lines. In conventional streaming content delivery, the client and server must maintain a continuous high bandwidth link for the duration of the content. In embodiments of the present invention, no such requirements are placed on the system. Content provided by the content provider is preferably high bandwidth video entertainment such as movies.

Additional advantages of the content distribution system of the present invention include increased security and protection of content for copyright holders. Copyright holders are less likely to release content without sufficient technical protection. In summary, their requirements are: content must only be available for playback on licensed devices, content must only be available for the purchased license period, content must be protected so that it is unlikely to be inappropriately copied, and in the event that content is inappropriately copied, it must be traceable to the original transaction.

Figure 1:
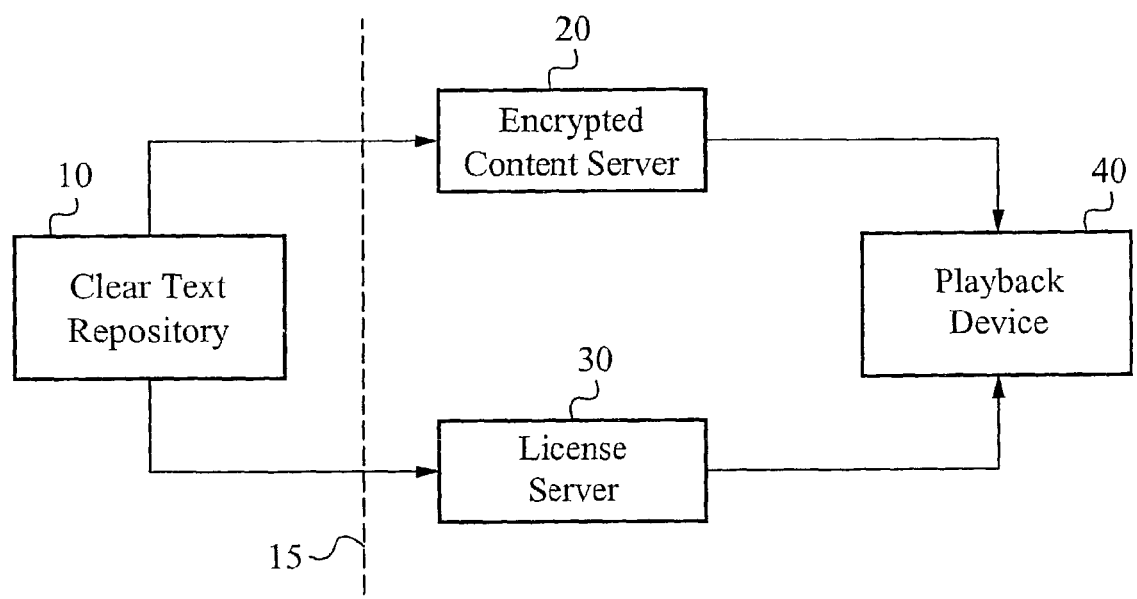
FIG. 1 illustrates a conventional Digital Rights Management (DRM) system.
Figure 2:
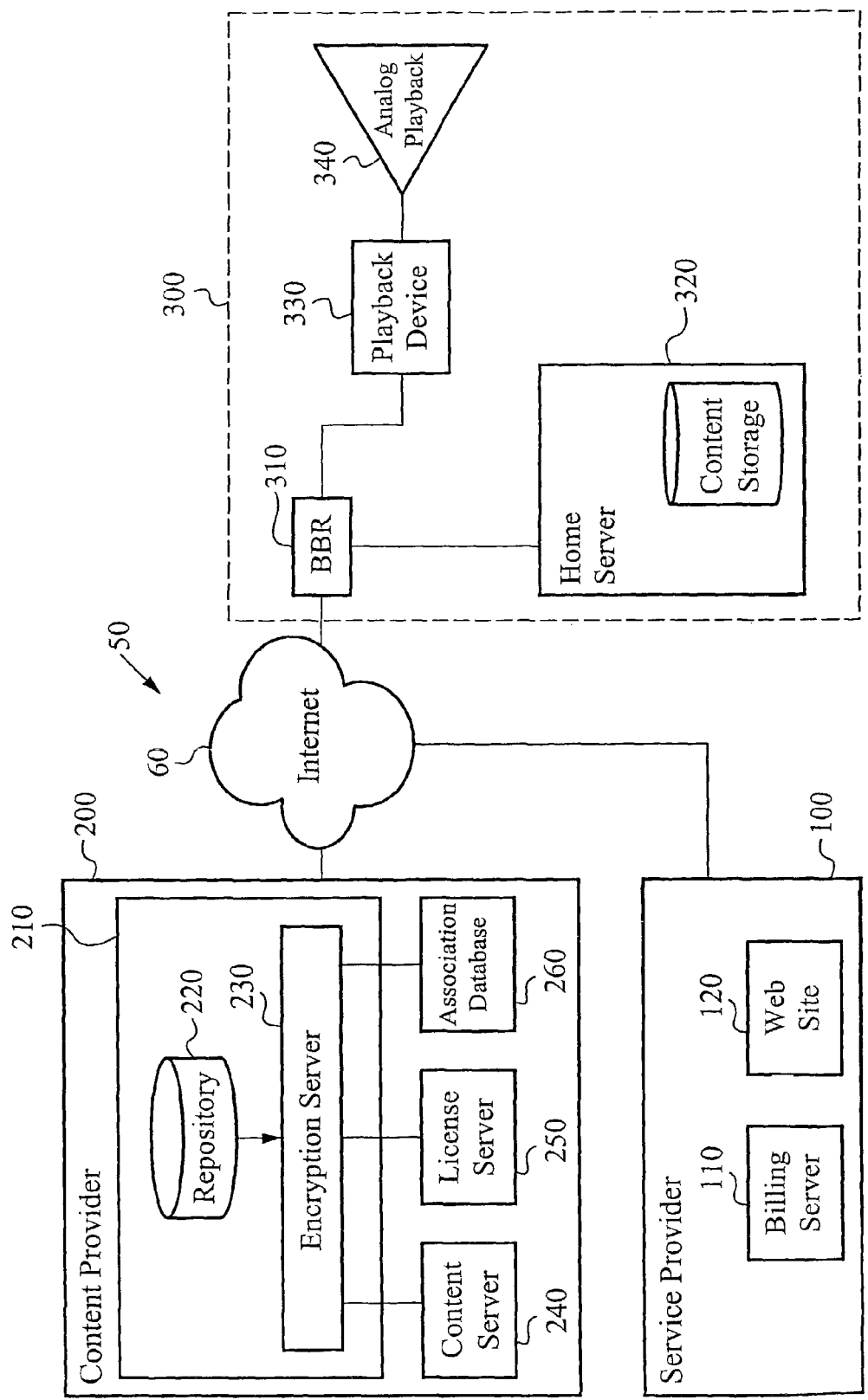
FIG. 2 illustrates a content protection system according to the preferred embodiment of the present invention.

FIG. 2 illustrates a content protection system according to the preferred embodiment of the present invention. The content protection system 50 includes a service provider 100, a content provider 200 and a customer premises 300. A function of the service provider 100 is to interact with the consumer and form a request that is sent to the content provider 200 for fulfillment. A customer is an end user associated with the customer premises 300. The service provider 100 also accepts notifications from the content provider 200 that the consumer's request has been completed and bills the consumer. The service provider 100, the content provider 200 and the customer premises 300 are each coupled to the Internet 60.

The service provider 100 includes an e-commerce web site 120 and a billing server 110. The web site 120 is a standard web site that validates the consumer, accepts the order, and sends the order to the content provider 200 for fulfillment. Functionality of the web site 120 preferably includes validating the consumer, formatting and signing the request of the consumer, validating the content provider 200, and sending the request to the content provider 200.

The billing server 110 performs billing of the customer as the final part of the fulfillment process. Since the service provider 100 does the billing, it is responsible for the relationship with the consumer. Billing should not occur until the content provider 200 informs the service provider 100 that the consumer has successfully obtained the content and license. Functionality of the billing server 110 preferably includes validating the content provider 200 and applying business rules included in the license to the satisfied request.

The content provider 200 is responsible for fulfilling the requests of the service provider 100 using the supplied credentials of the consumer. The content provider 200 includes a repository 220, an encryption server 230, a content server 240, a license server 250, and an associated database 260. The repository 220 stores unencrypted content as ClearText.

The encryption server 230 is responsible for taking the request created by the service provider 100 and creating an experience out of it. Functionality of the encryption server 230 includes validating the service provider 100, validating the request, validating the consumers' credentials, forming an association between the consumer and a playback device associated with the customer premises 300, encrypting the requested content, using the playback device's public key to encrypt the license envelope, validating the content server 240, validating the license server 250, delivering the encrypted content to the content server 240, and delivering the encrypted license to the license server 250. The repository 220 and the encryption server 230 are secured within a trusted area 210. The trusted area 210 is considered trusted as the repository 220 and the encryption server 230 preferably reside behind one or more separate firewall systems, and the encryption server 230 preferably requires double authentication connections from the service provider 100. The service provider 100 is allowed to place requests for content with a playback device certificate that the content provider 200 can independently verify. It should be clear to those skilled in the art that other methods of providing a trusted area can be used.

The content protection system 50 is dependent on an association between the consumer, the playback device, and a home server within the consumer premises 300. The home server includes a storage medium onto which the requested encrypted content is downloaded and stored. The association between the consumer, the playback device and the home server is preferably formed before the system allows the download and display of content. The consumer, the playback device and the home server are each given a unique certificate so the activity and authentications in the content protection system can be properly tracked. The playback device when manufactured is preferably provided with a signed digital certificate. Using this certificate, it is possible for the playback device to certify the consumer and the home server. The association database 260 includes the association, or linkage, between the consumer, playback device and home server. The association database 260 is responsible for creating this linkage as well as validating incoming requests (from the service provider 100 and content provider 200), and providing the consumer, home server and playback device public credentials to valid requesters.

The content server 240 is a standard service that allows the home server to connect and download encrypted content that has been specified for it. Functionality of the content server 240 includes validating contentions from the home server, allowing the home server to download the encrypted content that has been made available to it, and sending notification to the billing server 110 that the encrypted content has been delivered to the consumer.

The license server 250 is a service that allows the playback device to connect and retrieve licenses. Functionality of the license server 250 includes validating connections from the playback device, delivering license to the playback device, and sending notification to the billing server 110 that the license has been delivered to the consumer.

The customer premises 300 is preferably the customer's home and includes a home network coupled to the Internet 50 via a broadband connection. The customer premises 300 includes a broadband router (BBR) 310, the playback device 330 coupled to the BBR 310, an analog playback device 340 coupled to the playback device 330, and the home server 320 coupled to the BBR 310. The BBR 310 is preferably coupled to the Internet 50 via broadband, such as a DSL or cable modem. Preferably, the BBR 310 operates in a default configuration that only allows communications to take place in one direction. The communication must be initiated from within the customer premises 300. In general, this renders the BBR 310 as a secure "one-way" door into a network. The home server 320 is preferably a personal computer (PC) including a storage medium for storing encrypted content received from the content provider 200. Alternatively, the home server 320 can be a dedicated device used for storage of the encrypted content. Alternatively, the home server 320 and/or the playback device 330 are coupled directly to the Internet 50.

The playback device 330 is preferably a CNM based set-top box and the analog playback device 340 is a television. Alternatively, the playback device 330 is included within the analog playback device 340 such as an enhanced television or any other suitable analog playback device. Functionality of the playback device 330 includes validating the license server 250, validating the home server 320, decrypting the license envelope, decrypting the encrypted content, and decoding the content.

Figure 3:
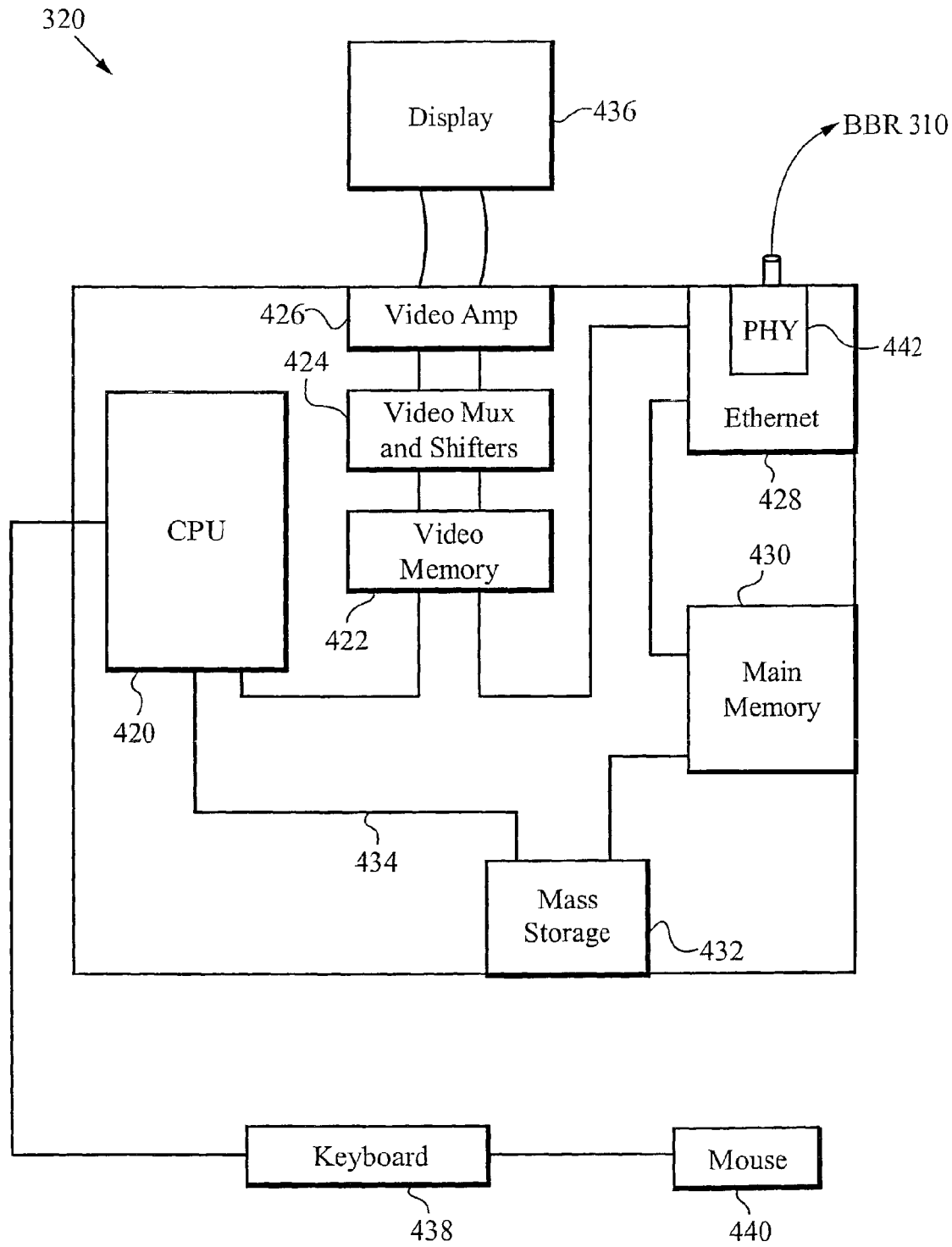
FIG. 3 illustrates a block diagram of an exemplary home server according to the present invention.

A block diagram of the internal components of an exemplary home server is illustrated in FIG. 3. As discussed above, the home server 320 is preferably a personal computer. The personal computer 320 includes a central processor unit (CPU) 420, a main memory 430, a video memory 422, a mass storage device 432 and an Ethernet interface circuit 428, all coupled together by a conventional bidirectional system bus 434. The interface circuit 428 includes the physical interface circuit 442 for sending and receiving communications on the Ethernet in-home network. In the preferred embodiment of the present invention, the interface circuit 428 is implemented on an Ethernet interface card within the personal computer 320. However, it should be apparent to those skilled in the art that the interface circuit 428 can be implemented within the personal computer 320 in any other appropriate manner, including building the interface circuit onto the motherboard itself. The mass storage device 432 stores the encrypted content received from the content server 240 (FIG. 2) and may include both fixed and removable media using any one or more of magnetic, optical or magneto-optical storage technology or any other available mass storage technology. The system bus 434 contains an address bus for addressing any portion of the memory 422 and 430. The system bus 434 also includes a data bus for transferring data between and among the CPU 420, the main memory 430, the video memory 422, the mass storage device 432 and the interface circuit 428.

The personal computer 320 is also coupled to a number of peripheral input and output devices including the keyboard 438, the mouse 440 and the associated display 436. The keyboard 438 is coupled to the CPU 420 for allowing a user to input data and control commands into the personal computer 320. A conventional mouse 440 is coupled to the keyboard 438 for manipulating graphic images on the display 436 as a cursor control device.

A port of the video memory 422 is coupled to a video multiplex and shifter circuit 424, which in turn is coupled to a video amplifier 426. The video amplifier 426 drives the display 436. The video multiplex and shifter circuitry 424 and the video amplifier 426 convert pixel data stored in the video memory 422 to raster signals suitable for use by the display 436.

Figure 4:
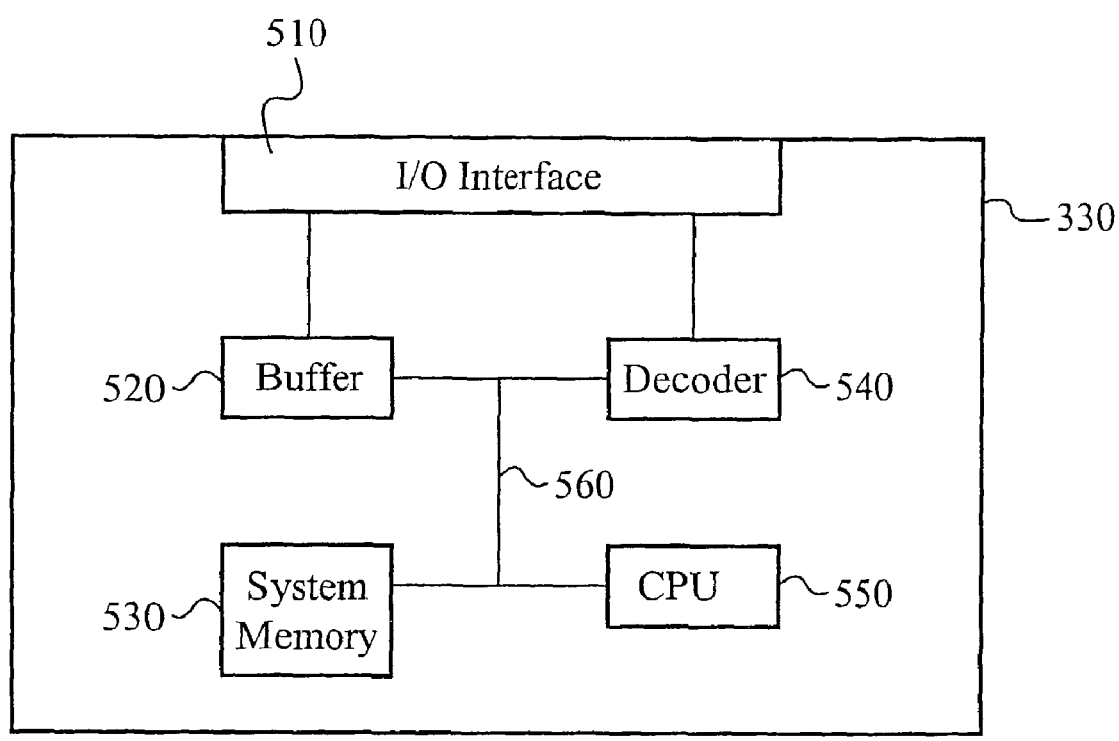
FIG. 4 illustrates a block diagram of an exemplary playback device according to the present invention.

FIG. 4 illustrates an exemplary playback device according to the present invention. The playback device 330 is preferably a set-top box that includes the CNM module, where the set-top box is coupled to a television for display. Alternatively, the playback device 330 is combined with the analog playback device 340 such that the CNM module resides within a display device such as a television. The set-top box preferably controls the transmission of content from a local storage device such as personal computer (PC) to a television. The playback device 330 includes an input/output (I/O) interface 510, a buffer 520, a system memory 530, a decoder 540, and a central processing unit (CPU) 550 all coupled via a bi-directional bus 560. The I/O interface 510 preferably couples the playback device 330 to the BBR 310 to receive encrypted content stored in the home server 330 and to receive associated encryption keys from the license server 250 (FIG. 2), and to the analog playback device 340 (FIG. 2)

or other display device to display the content received from the home server 320. It should be clear to those skilled in the art that the playback device 330 can be coupled to a device different than a PC for receiving encrypted content.

The system memory 530 stores the operating software used to enable operation of the playback device 330. Any conventional type of memory can be used. The buffer 520 receives and buffers sequential portions of the streaming encrypted content from the home server 320 while simultaneously receiving and buffering the associated encryption key needed to decrypt the portion of the encrypted content. The portion of the encrypted content and the associated encryption key are sent to the decoder 540. The decoder 540 decrypts and decodes the content according to access authorization associated with the encryption key. Preferably, multiple encryption keys are used to encrypt/decrypt the content such that each encryption key encrypts/decrypts a portion of the content. The encryption keys are streamed from the license server 250 to the playback device 330 as they are needed, not all at once. Preferably, the encryption keys are not stored in system memory 530 of the playback device 330, only temporarily buffered in the buffer 520. In this manner, security of the encryption keys is improved. Alternatively, a single encryption key is used to encrypt/decrypt the entire content.

The playback device 330 connects to the home server 320 to access the encrypted content and to the license server 250 to obtain access to the rights for the playback. The playback device 330 preferably only initiates connections and does not accept connections initiated from other devices. The encrypted content is decrypted by the playback device 330 in secure hardware and preferably outputs the content as analog, macrovision-protected video.

Functionality of the playback device 330 includes browsing capability, video playback, audio playback, and network configuration. The playback device 330 includes protocol stacks to allow for network connectivity with many different networking environments.

Figure 5:
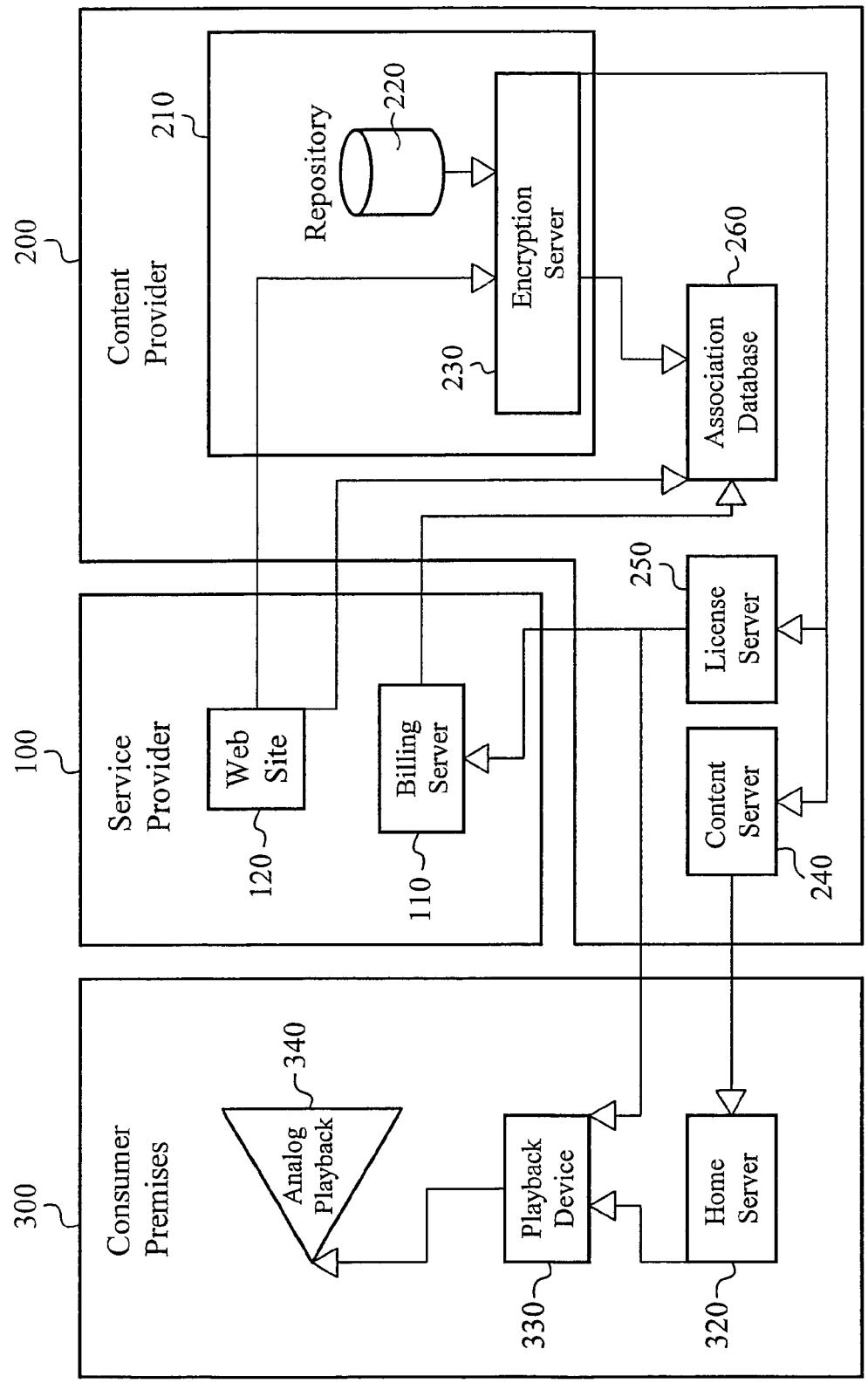
FIG. 5 illustrates an operational diagram of the content protection system illustrated in FIG. 2.

FIG. 5 illustrates an operational diagram of the content protection system 50 illustrated in FIG. 2. There are several classes of connection in the content protection system 50. The performance and characteristics of each of the connections depends upon the specific technology applied in each instance. The types of connections described below are the preferred connection types. It is understood by those skilled in the art that other types of communication connections can be used by the content protection system of the present invention.

The home server 320 is preferably coupled to the content server 240 over the broadband Internet connection. Preferably, this is a DSL or cable modem type connection with a minimum bandwidth of about 384 Kbits/sec.

The playback device 330 is preferably coupled to the home server 330 using the in-home network which may be wired or wireless. Preferably, the in-home network is Ethernet 10 base-T. The consumer accesses content that is stored on the home server 320 via the playback device 330.

The playback device 330 is preferably coupled to the license server 250 over the broadband Internet connection. As the encrypted content is accessed on the home server 320, the playback device 330 contacts the license server 250 to obtain the playback license and associated encryption keys for the encrypted content. The license server 250 preferably streams the license to the playback device 330, as it is needed. Alternatively, the license may be downloaded and used once on the playback device 330. The playback device 330 also from time to time connects to the license server 250 to obtain the current time in a secure fashion.

The web site 120 is preferably coupled to the encryption server 230 over a private network. After the consumer confirms their content request, the electronic commerce web site 120 contacts the encryption server 230 with the details of the request including the content id, requested license conditions, and consumer identification information. Preferably, the private network is contained within a business that is not accessible from the outside.

The web site 120 is preferably coupled to the association database 260 over a virtual private network (VPN). Identification credentials presented by the consumers are verified by the association database 260. Preferably, the VPN is an encrypted network connection between two points on the Internet that allows the transmission of private data over a public medium.

The billing server 110 is preferably coupled to the association database 260 over the VPN. The playback device identification and the content identification data are presented to the billing server 110. The billing server 110 asks the association database 260 for the billing information for the consumer associated with this playback device.

The encryption server 230 is preferably coupled to the content server 240, to the license server 250, and to the association database 260 over a private network. The encryption server 230 presents the consumers credentials and expects to receive the public keys for the playback device 330 and the home server 320. After the content is watermarked and encrypted by the encryption server 230, the encrypted content is delivered to the content server 240. In a similar manner to the encrypted content, the encrypted license is delivered to the license server 250.

The license server 250 is preferably coupled to the billing server 110 over the VPN. As the license is verified and downloaded to the playback device 330, the billing cycle is started by the billing server 110. The license server 250 provides the billing server 110 the identification of the playback device 330 and the identification of the content.

Encryption of the content is preferably done using the advanced encryption standard (AES). Each encryption key is associated with a portion of the content, where the size of each portion randomly varies. The resulting encryption key sequence is then encrypted with the public key of the playback device 330.

As discussed above, the encryption server 230 encrypts and watermarks the content. Watermarking is a content protection mechanism used for a variety of purposes with digital content. The basic use of the watermarking is to discover pirated copies and claim copyright infringement. Watermarking is a process by which an electronic signature is added to content, making that content traceable back to the point where the watermark was added. Information related to the content ownership is embedded permanently and invisibly into the content. Watermarking is a separate field from encryption. However, it is desirable to combine the two by first watermarking the content and then encrypting it.

Preferably, a watermark is applied to the content before it is encrypted for a specific playback device so that in the event that a resulting clear text content is discovered "in the wild" it may be traced back to a particular transaction. Such functionality requires that each content delivery be uniquely watermarked and uniquely encrypted. Alternatively, only selected deliveries of content are watermarked, or watermarking is not performed at all within the content protection system of the present invention.

Licenses streamed to the playback device 330 preferably include a validity period. Once the validity period expires, the license is no longer valid. In general, clocks on systems are not trustworthy. To ensure that the playback device 330 accurately measures the validity period, the content protection system includes a design provision for a secure clock. Preferably, the playback device 330 is provided access to a secure clock residing on the license server 250 to obtain accurate time measurements. Alternatively, a secure distributed clock algorithm is used. Secure distributed clock algorithms ensure that the notion of time on the playback device is secure, and monotonically increasing, and on a regular basis are updated for accuracy.

In operation, a consumer makes a request for content to a service provider. The customer is preferably connected to the service provider over the Internet. In the request, the customer specifies content to be delivered and a playback device to which the content is to be delivered. The playback device preferably resides within a home network which includes a home server. The home server is preferably a personal computer. The service provider passes the request to a content provider where authentication and validation of the request are performed. Once the request is approved, the requested content is encrypted and stored on a content server, and a license including associated encryption keys are stored on a license server. Preferably, both the content server and the license server are operated by the content provider. Over the course of some time period, the encrypted content is transmitted to and stored on the home server to be used at a later date. The license remains at the license server. When the playback device initiates playback of the content, the encrypted content is streamed from the home server to the playback device, while the license and associated encryption keys are simultaneously streamed from the license server to the playback device. The playback device sequentially decrypts and decodes the streaming encrypted content using the encryption keys streamed from the license server. The playback device sends the content to an analog playback device. Security is enhanced since the encryption keys are not stored on the customer premises, the encryption keys are minimally out of the control of the content provider.

Although the content protection system of the present invention is described as a consumer initiating a content request from the customer premises, the consumer can also initiate a content request from a location other than the customer premises. In this case, the customer initiates a content request to a content provider, preferably via a service provider, from a location different than the customer premises and specifies the location of the customer premises to which the requested content is to be delivered.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of securely providing content from a content source to a local device, the method comprising:
   a. downloading and storing encrypted content from the content source to a local storage within a local server;
   b. storing one or more encryption keys corresponding to the encrypted content at the content source; and
   c. utilizing the encrypted content by streaming segments of the encrypted content from the local storage to a processing circuit within the local device while the one or more encryption keys are simultaneously streamed from the content source to the processing circuit.

2. The method according to claim 1 wherein the one or more encryption keys are streamed from the content source to the processing circuit over a secure connection.

3. The method according to claim 1 wherein utilizing the encrypted content comprises playing the content on an audio or display device.

4. The method according to claim 1 wherein the processing circuit decrypts the segments of the encrypted content using the one or more encryption keys.

5. The method according to claim 1 wherein the encrypted content is not downloaded from the content source to the local storage in real-time.

6. The method according to claim 1 wherein the content comprises audio, video, or image data.

7. The method according to claim 1 wherein the one or more encryption keys are stored at the content source as encrypted encryption keys.

8. The method according to claim 1 further comprising utilizing a secure clock to synchronize streaming of the segments of the encrypted content and the one or more encryption keys.

9. The method according to claim 8 wherein the secure clock ensures the enforcement of time-based rules associated with the one or more encryption keys.

10. The method according to claim 8 wherein the secure clock is located at the content source.

11. A network of devices to securely process content, the network of devices comprising:
    a. a remote content source;
    b. a home server comprising a local storage coupled to the remote content source to store encrypted content received from the remote content source; and
    c. a local device coupled to the local storage to receive segments of the encrypted content streamed from the local storage while one or more encryption keys are simultaneously streamed from the content source to the local device, wherein the local device decrypts the segments of the encrypted content according to the one or more encryption keys.

12. The network of devices according to claim 11 wherein the local device comprises the home server.

13. The network of devices according to claim 11 wherein the local device comprises a set-top box coupled to the home server.

14. The network of devices according to claim 11 wherein the local device comprises a television coupled to the home server.

15. The network of devices according to claim 11 further comprising an audio or display device coupled to the local device, wherein the local device sends the decrypted content to the audio or display device for playback.

16. The network of devices according to claim 11 wherein the content source includes a secure clock and the local device utilizes the secure clock to synchronize decryption of the segments of the encrypted content according to the one or more encryption keys.

17. The network of devices according to claim 11 wherein the local device and the local storage are coupled via a home network.

18. The network of devices according to claim 17 wherein the home network and the content server are coupled to the internet.

19. The network of devices according to claim 18 wherein the home network is coupled to the internet via a broadband connection.

20. The network of devices according to claim 17 wherein the home network comprises an ethernet network.

21. The network of devices according to claim 17 wherein the home network comprises a wireless network.

22. The network of devices according to claim 11 wherein the one or more encryption keys are stored at the content source as encrypted encryption keys.

23. The network of devices according to claim 11 wherein the content comprises audio, video, or image data.

24. A device to securely process content, the device comprising:
   a. an input/output interface to receive a stream of segments of encrypted content from a local storage within a local server and to receive a stream of one or more encryption keys from a content source; and
   b. a processing circuit coupled to the input/output interface to receive the stream of segments of encrypted content and the stream of one or more encryption keys, and to decrypt the segments of encrypted content according to the one or more encryption keys, wherein each of the one or more encryption keys is associated with each of the segments of encrypted content.

25. The device according to claim 24 wherein the device comprises the local server.

26. The device according to claim 24 wherein the device comprises a set-top box.

27. The device according to claim 24 wherein the device comprises a television.

28. The device according to claim 24 wherein the device is coupled to an audio or display device, and the processing circuit sends the decrypted content to the audio or display device via the interface for playback.

29. The device according to claim 24 wherein a secure clock is utilized to synchronize the decryption of the segments of encrypted content according to the one or more encryption keys.

30. The device according to claim 29 wherein the secure clock is located on the content source.

31. The device according to claim 24 wherein the device resides within a home network.

32. The device according to claim 24 wherein the device is coupled to the content source via the internet.

33. The device according to claim 24 wherein the content comprises audio, video, or image data.

* * * * *